United States Patent [19]

Gipson

[11] Patent Number: 4,940,370
[45] Date of Patent: Jul. 10, 1990

[54] INNER LUG REMOVAL TOOL

[76] Inventor: Gregory L. Gipson, 4748 N. 28th Dr., Phoenix, Ariz. 85017

[21] Appl. No.: 421,850

[22] Filed: Oct. 16, 1989

[51] Int. Cl.⁵ .............................................. B23B 49/00
[52] U.S. Cl. ................................... 408/72 R; 29/802; 81/53.2; 408/201; 408/203.5; 408/204
[58] Field of Search ................. 81/53.2; 408/1 R, 84, 408/200, 201, 203.5, 204, 241 R, 72 R; 29/802

[56] References Cited

U.S. PATENT DOCUMENTS

| | | | |
|---|---|---|---|
| 981,227 | 1/1911 | Schwartz | 408/84 X |
| 3,327,570 | 6/1967 | McClarran | 408/1 R X |
| 3,913,427 | 10/1975 | Brase | 81/53.2 |
| 4,781,082 | 11/1988 | Swertz | 81/53.2 |

Primary Examiner—Steven C. Bishop
Attorney, Agent, or Firm—Gregory J. Nelson

[57] ABSTRACT

A tool for removing broken threaded fasteners such as a seized or damaged lug mounted on a stud extending from the hub of a dual wheel assembly. The tool includes a pilot member having generally cylindrical exterior surface which defines an axially extending threaded bore engageable with the stud extending through the broken lug. A cutter member has a body defining a guided bore which is engageable about the exterior of said pilot member and is rotatable by means of a power tool. When the cutter member is advanced at least the flange portion of the lug nut is cut away so that the inner wheel rim can be removed from the hub and thereafter the remaining shaved lug nut can be removed.

8 Claims, 2 Drawing Sheets

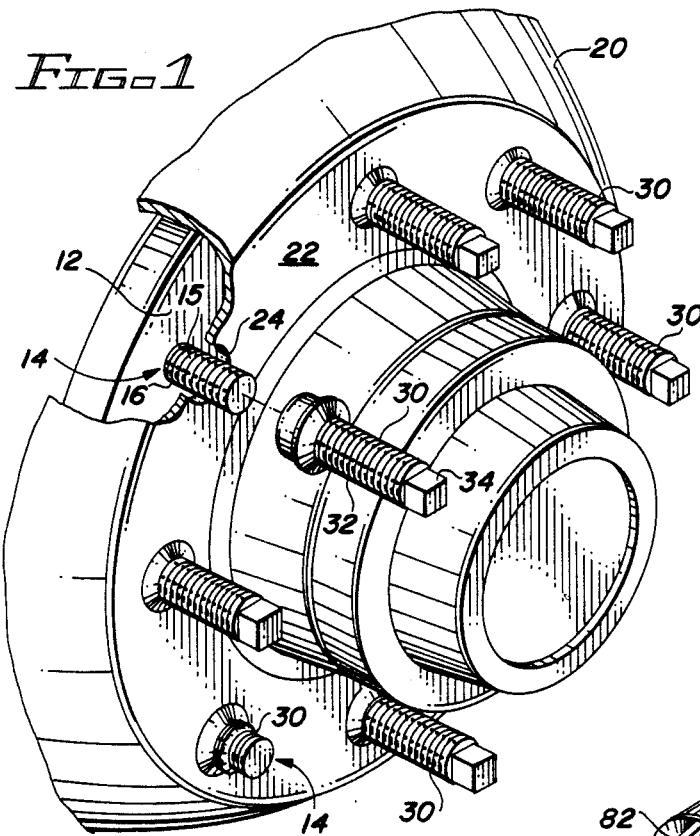
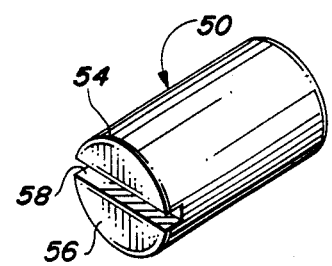
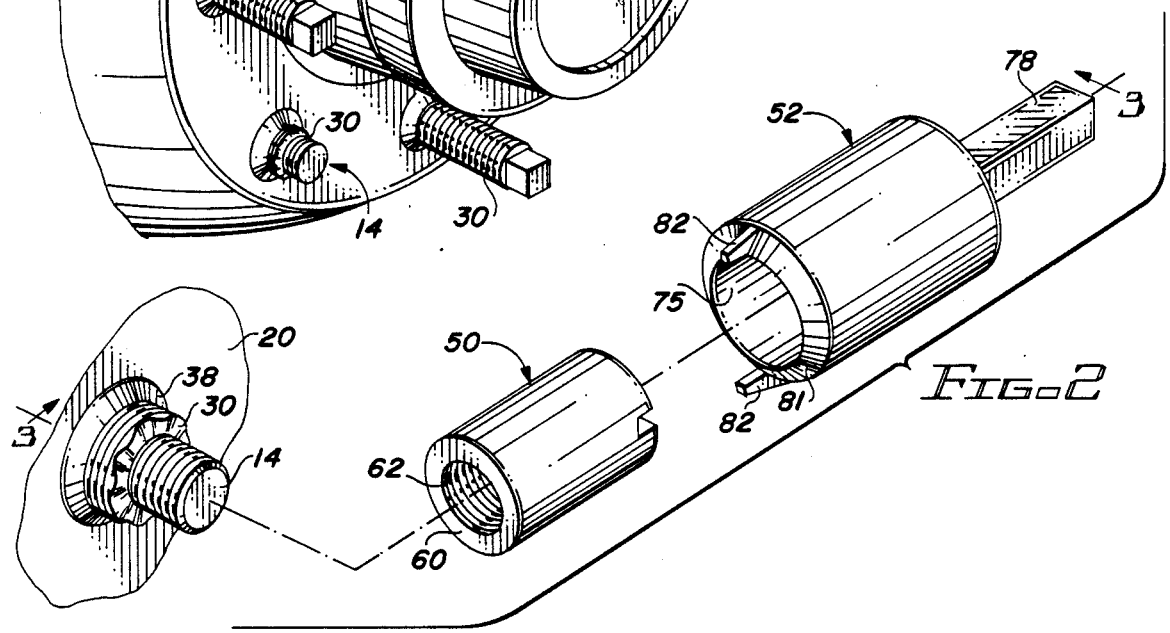
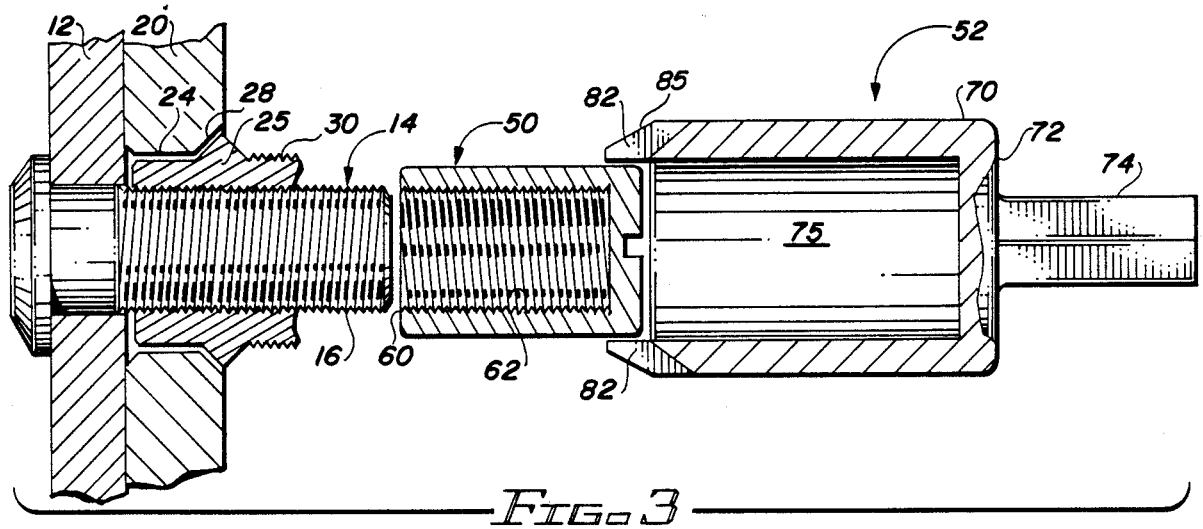

INNER LUG REMOVAL TOOL

This invention relates to a tool for removing threaded fasteners and more particularly to a tool for removing damaged or seized lugs from a wheel such as a truck wheel. Vehicles such as large trucks have dual truck wheel assemblies which are secured in place by an arrangement which has a series of circumferentially arranged lugs which are threaded on studs which extend from the brake drum or axle hub. The lugs extend through registering openings in the inner dual wheel rim. These inner lugs have an externally threaded shank portion which receive the cap nuts which are internally threaded and secure the outer rim in place. The inner end of each of the lugs has an enlarged beveled collar which engages a mating surface at the hole or bore in the inner rim and when tightened, the collar secures the inner wheel rim in position. The shank of the lugs each has an outer end provided with flattened faces which facilitate being engaged by an appropriate wrench for removal of the rims. The lug extends through matching bores in the outer wheel rim which is held in place by hex nuts in threaded engagement with the extending end of the lug.

When it is necessary to remove the inner wheel rim, the hex nuts retaining the outer wheel rim are removed from the lug and the outer truck wheel is removed. However, in many instances, the threaded lugs may become frozen or seize and when attempting removal of the inner wheel rim for tire repair or replacement, the end of the lug may be broken off. This usually occurs because the lug has become rusted and is frozen to the stud on which it is mounted. The lug nuts often are broken or damaged due to excessive torque applied by an impact wrench or similar tool. In such cases, removal of the broken lug becomes a laborious and difficult task.

Conventional procedures for removing a broken lug involves cutting the lug away. If the lug is broken very near its inner end, removal in this way is often difficult as there is not enough exposed material to obtain purchase with a gripping tool. In such a case, the mechanic must often resort to use of a chisel or cutting torch which may cause damage to the inner studs and even the wheel hub itself. Further, use of a chisel or torch to cut away the lug requires a substantial amount of mechanic time which also results in substantial loss of truck travel time.

Accordingly, there is a need in the art for a reliable, convenient tool for quickly removing the remaining portion of a broken lug from wheel studs.

One prior art tool incorporates a plate-mounted cutter. The plate has holes which register with the stud-mounted lugs adjacent the broken nut. The cutting portion of the device registers with the broken nut. The plate is secured in place by tightening nuts against the mounting plate at the adjacent lugs. The cutter is then manually operated through a ratchet tool to sever the flared portion of the lug from the inner stud. One such tool of this type is sold under the designation "Bud Nut Cutter".

Another tool for removing broken threaded fasteners is shown in U.S. Pat. No. 3,913,427. This patent describes a tool for removing broken threaded fasteners which tool has an open-ended gripping member which has a recess with an interior wall having ridges which grip the fastener when driven onto the fastener. The gripping member is fixed at one end of a threaded shaft and extends to the end wall of a sleeve and is attached at the other end to a flat-sided head. A movable nut is threaded to the shaft between the sleeve and the head for removing the gripping member from the broken fastener after it has been loosened.

Pat. No. 4,781,082 discloses a broken stud and nut remover. The patent shows a two-piece kit for removal of a damaged wheel lug stud and includes a nut having a splined aperture and a drive-on tool. The drive-on tool has a recess in one end for loosely accepting the nut when the nut is placed in the recess. When the nut is driven on the lug, the interior edges of the nut grip the lug stud so the nut may thereafter be twisted by a gripping member.

Thus, while the aforementioned procedures and tool for removing lugs are in some cases effective, they are not effective in all cases and may require excessive time or labor.

Accordingly, it is a broad object of the present invention to provide a tool which is easy and efficient to operate and in a minimum amount of time will cut-away the projecting collar or flange on a lug so that the inner truck rim may be removed exposing the remaining inner portion of the lug so that it can be easily gripped and loosened by an appropriate tool.

The above objects and advantages of the invention are accomplished by a tool having a generally cylindrical pilot member defining an internally threaded socket. The socket threads match the threads on the stud on which the lug is mounted. When the lug is broken off near the inner wheel, the stud threads are exposed and the pilot may be placed in threaded engagement with the stud and tightened until the inner end of the pilot engages the broken portion of the lug. A cutter is provided having a shank cooperable with a power tool so the cutter may be driven by the power tool The cutter has a generally cylindrical socket which is engageable over the exterior of the pilot and rotatable about the pilot. The cutter is provided with cutting teeth which are axially aligned with the collar extending at the inner end of the lug. The cutter is rotated and advanced along the pilot bringing the cutter teeth into engagement with the lug collar so that the teeth cut the collar away. Once the collar has been cut away, the cutter is removed and the pilot unscrewed from the lug. The inner wheel can then be removed as the collar no longer obstructs the inner wheel. Once the inner wheel is removed, the remaining portion of the lug can be easily removed by hand or by application of torque with a suitable gripping tool.

Accordingly, the entire loosening and removal process for an otherwise difficult-to-remove, seized fastener can be performed quickly with minimum effort even by a relatively unskilled mechanic.

Other objects, advantages and features of the invention will become apparent from the following detailed description taken in conjunction with the accompanying drawings in which:

FIG. 1 is a perspective view of a typical truck axle hub and inner wheel with projecting lugs showing one of the lug in a broken and seized condition;

FIG. 2 is a perspective view of the tool of the present invention;

FIG. 2A is a perspective view from the closed end of the pilot;

FIG. 3 is a longitudinal sectional view of the tool of the present invention;

Figure 4:
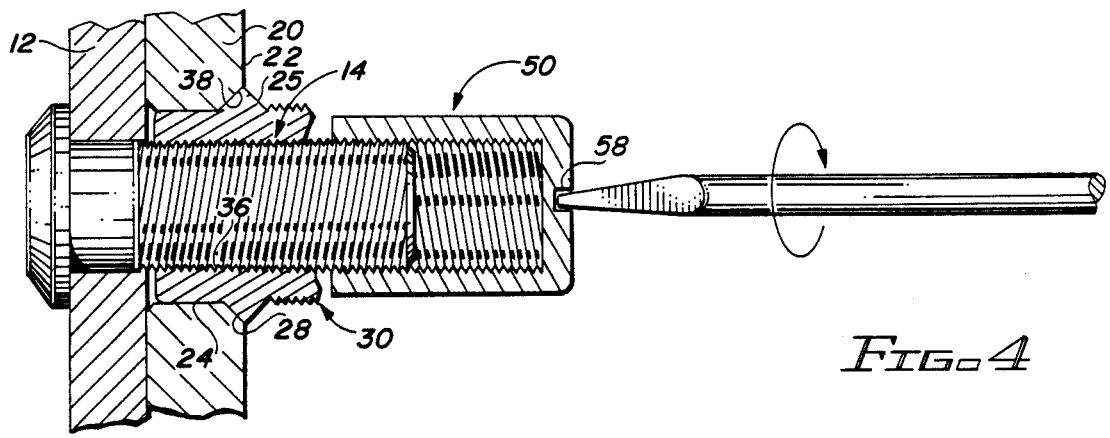
Figure 5:
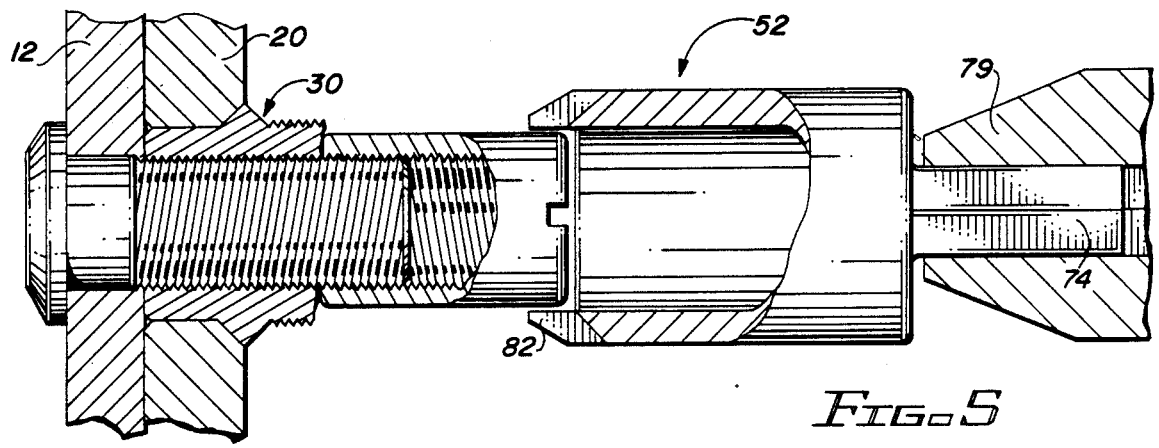

FIGS. 4 to 7 sequentially illustrate the use and operation of the tool of the present invention.

Referring now to the drawings, FIG. 1 shows a typical dual truck wheel axle and hub assembly. The axle assembly includes an inner hub 12 having a plurality of circumferentially arranged studs 14 extending outwardly from the hub. The studs have a body 15 which is externally threaded at 16. The inner dual wheel rim 20 carries a pneumatic tire, not shown. The rim has a mounting surface 22 which defines a plurality of circumferentially arranged bores 24 which register with the studs and are somewhat larger in diameter than the external diameter of the studs 14. The bores each have a tapered or chamfered outer edge 28 which complementarily receives a tapered collar or flange 25 on the inner end of the lug 30. The lug 30 has a shank or body which is externally threaded at 32 having an outer end with flattened faces 34 which are adapted to receive a wrench or similar tool. The lugs are internally threaded at 36 and are threadably accepted upon the shank or body of the studs. The inner end of the lugs carry a collar 25 having a tapered portion 38 which complementarily engages the tapered or chamfered portion of the circumferential bores on the inner wheel rim to hold the wheel rim in place.

The outer wheel rim is not shown but has a plurality of mounting holes which are adapted to register with the lugs and are held in place by hex nuts. The inner wheel rim is thereby secured to the wheel hub and held in place by the inner collar 25 on the lugs 30. The outer wheel rim is mounted on the lugs and held in place by hex nuts, not shown.

The wheel lugs can be damaged or become seized and it is not uncommon for the lug nut to break off when the lug is tightened or it is attempted to be removed with an impact wrench or other torqueing tool. Often the lug will break away as shown in FIG. 4 adjacent the surface of the inner wheel leaving an insufficient portion of the lug remaining so the lug cannot be gripped by a removal tool. As will be explained hereafter, the tool of the present invention facilitates removal of the broken lug quickly and conveniently.

The tool of the present invention basically includes a pilot member 50 and a cutter 52. The pilot member has a generally cylindrical outer surface 54 with a flat end face 56. A transverse slot 58 extends diametrically across end face 54. A socket or cavity 60 is provided in the opposite end of the pilot which socket is provided with threads 62 which are selected to be cooperatively engageable with the threads 16 of the stud extending from the brake drum. The internal threads 62 are either right-handed or left-handed depending on the pitch direction of the stud threads 66. Generally, the studs on the right or passenger side of the vehicle are right-handed and the driver's side studs are left-handed. Preferably, the depth of the threads in the pilot should at least correspond to the length of that portion of the stud typically extending beyond the surface 22 of the inner wheel. The pilot may be of any suitable material such as a heat-treated tool steel and may be provided with an antifrictional exterior coating such as Teflon.

Cutter member 52 has a generally cylindrical body 70 with an end face 72. A shank 74 axially extends from end face 72 with flattened surfaces 78 adapted to be engaged by the chuck 79 of a suitable power tool such as drill, impact wrench or the like.

The cutter defines a generally cylindrical socket 75 the depth of which generally corresponds to the overall length of pilot 50. The diameter of the socket also closely corresponds to the diameter of the pilot but sufficient clearance is provided so that the cutter is rotatively guided by the pilot. The cutter may be formed of any suitable material such as heat-treated tool steel. The forward cylindrical edge of the cutter is tapered at 81 at typically 45 and is provided with one or more cutting teeth 82. In the embodiment shown, a pair of teeth 82 are diametrically arranged at opposite edges of the cutter. The teeth are preferably carbide or similar material and have a beveled cutting surface 85 angularly corresponding to the chamfer or taper 28 at the outer edge of the bores on the inner truck wheel.

The present invention will be better understood from the following description of use for removing a broken lug nut as shown in FIGS. 4 to 7. The pilot 50 is first aligned with the broken lug and placed in threaded engagement therewith and manually tightened until the inner end of the pilot engages the edge of the broken lug. The lug is broken at a location just above the surface 22 of the inner truck wheel so that it is not possible for a mechanic to grip the protruding portion of the lug with a wrench or similar tool in order to gain purchase to torque the lug.

Figure 6:
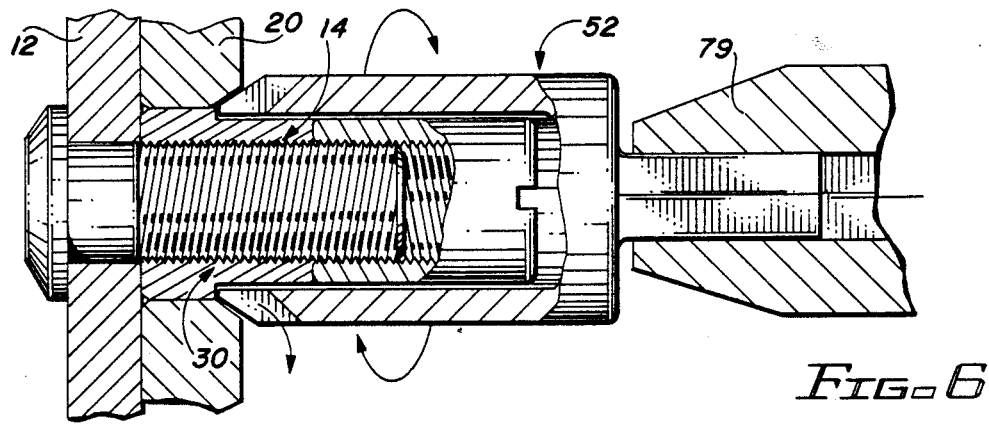
Figure 7:
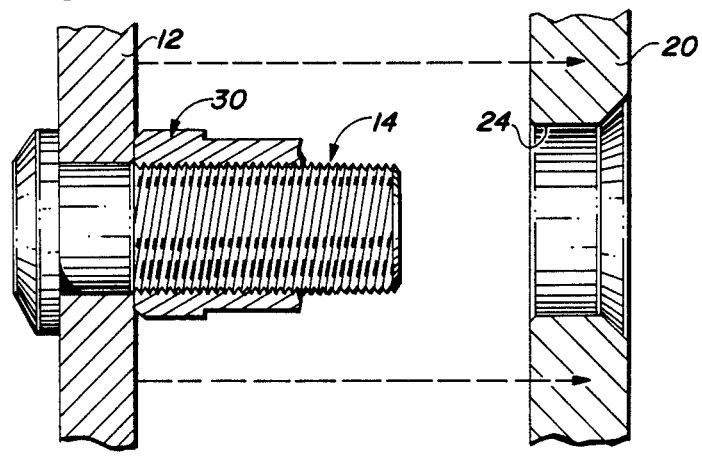

Once the pilot has been manually tightened, it can be further tightened by applying a screwdriver or other tool to the transverse slot 58 at the opposite face of the pilot. With the pilot in threaded engagement on the stud, the cutter may be engaged on a power tool such as a drill by placing the shank 74 in the chuck of the drill and tightening the chuck 79. The cutter socket 75 is then placed over the pilot and axially advanced and brought into contact with the broken lug nut. The cutter is rotated by means of the power drill and advanced as the cutting proceeds. The carbide teeth 82 will cut away the flange or collar portion 33 of the broken lug. As seen in FIG. 6, the cutting operation should continue until the flange is entirely cut away. The angle of the cutting surfaces 85 of the teeth 82 corresponds to the taper of bore 24 so no damage occurs to the wheel. The taper 81 also provides chip clearance for removed material. Once the flange is removed, the cutter and drill may be withdrawn from the pilot. The pilot is then disengaged from the threaded portion of the stud by utilizing a screwdriver or similar tool in the slot 58 in the face end of the pilot to twist the pilot.

The remaining lugs are removed and with the removal of the flange at the seized lug, the inner rim may be pulled from the axle assembly. The collar or flange of the seized lug being removed, no longer obstructs removal of the truck rim. Once the rim is removed, the remaining portion of the lug nut may be easily removed from the stud manually or by engagement with a suitable wrench or other gripping tool.

The entire removal operation can easily and quickly be accomplished by the mechanic.

From the foregoing, it is apparent that the tool of the present invention is efficient and effective for removing seized or broken lug nuts. While the tool has particular application to broken lug nuts, it is obvious that the tool can be applied to other mechanical installations where threaded fasteners are seized on a threaded member. The tool of the present invention may be operated even by unskilled labor so that substantial cost is saved in removing seized or broken lugs.

It will be obvious to those skilled in the art to make various changes, alterations and modifications to the device described herein. To the extent such changes, alterations and modifications do not depart from the spirit and scope of the appended claims, they are intended to be encompassed therein.

I claim:

1. A tool for removing a seized or broken lug engaged on a threaded shaft comprising:
   (a) a pilot member having a generally cylindrical exterior surface and defining an interior axially extending threaded bore threadably engageable with said shaft;
   (b) a cutter member having a body defining a guided bore rotatively engageable about the exterior surface of said pilot member, said cutter having cutting means on said body at a location engageable with at least a portion of said nut; and
   (c) means for rotating said cutter.

2. The tool of claim 1 wherein said pilot member is provided with means on the exterior surface for engagement with a tool.

3. The tool of claim 1 wherein said pilot member is provided with an antifrictional exterior coating.

4. The tool of claim 1 wherein the depth of said guided bore at least corresponds to the overall axial length of said pilot member.

5. The tool of claim 1 wherein said pilot member and said cutter member are of tool steel.

6. The tool of claim 5 wherein said cutting means comprise carbide teeth oppositely positioned on said cutter member.

7. A tool for removing a seized or broken lug engaged on the threaded stud of a dual wheel assembly in which the lug and stud extend through a bore in the inner wheel, said tool comprising:
   (a) a pilot member having a generally cylindrical exterior surface and a flat end face at one end and defining an interior axially extending threaded bore at the other, said threaded bore being threadably engageable with said threaded stud;
   (b) a cutter member having a body defining a guided bore rotatably engageable about the exterior of said pilot member, said cutter having at least one cutting tooth extending therefrom and being generally aligned with at least a portion of said nut; and
   (c) a shank extending from the body of said cutter and adapted to be placed in driven engagement with a power tool.

8. The tool of claim 7 wherein said cutting means is configured corresponding to the shape of the bore in the inner wheel.

* * * * *